Oct. 29, 1957
A. D. BUCHANAN
2,811,169
LIQUID LEVEL CONTROL VALVE
Filed April 19, 1956
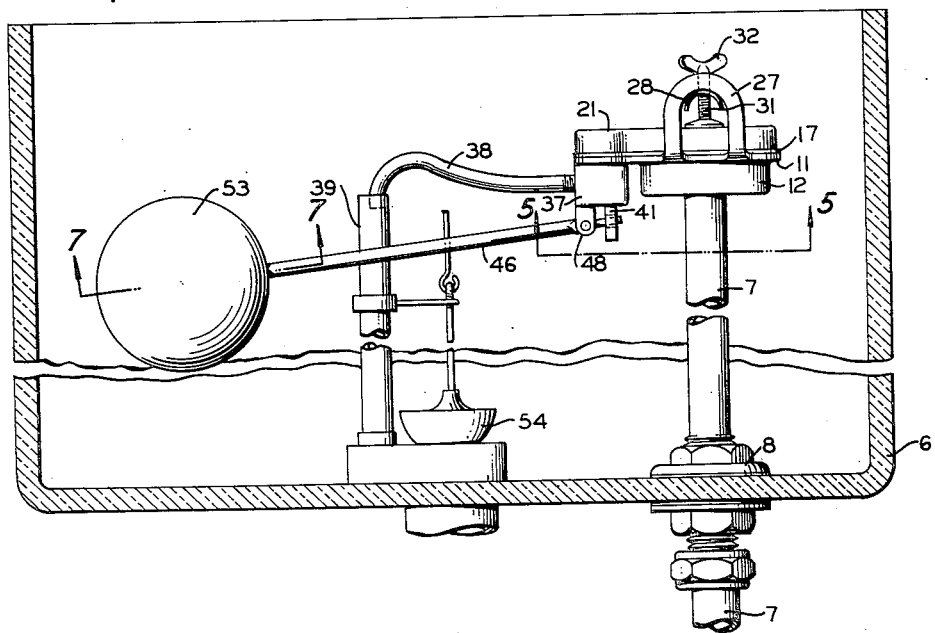
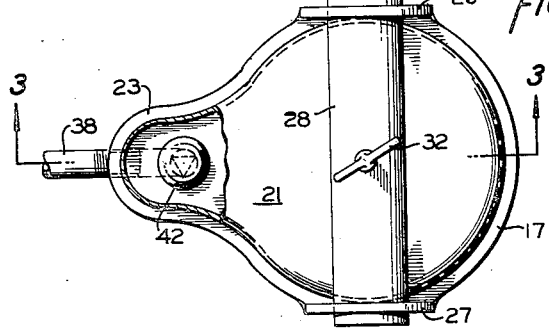
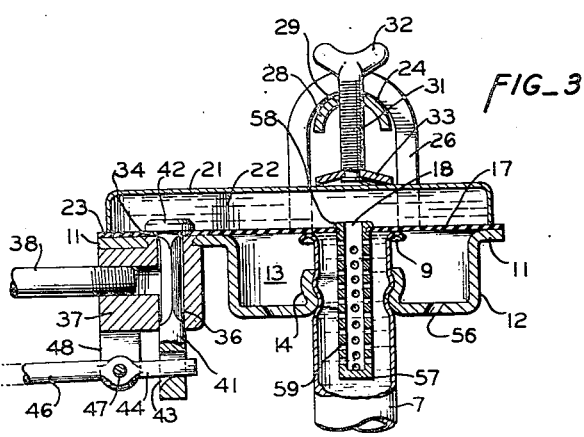
INVENTOR.
AVERY D. BUCHANAN
ATTORNEYS Oct. 29, 1957 A. D. BUCHANAN 2,811,169
LIQUID LEVEL CONTROL VALVE
Filed April 19, 1956
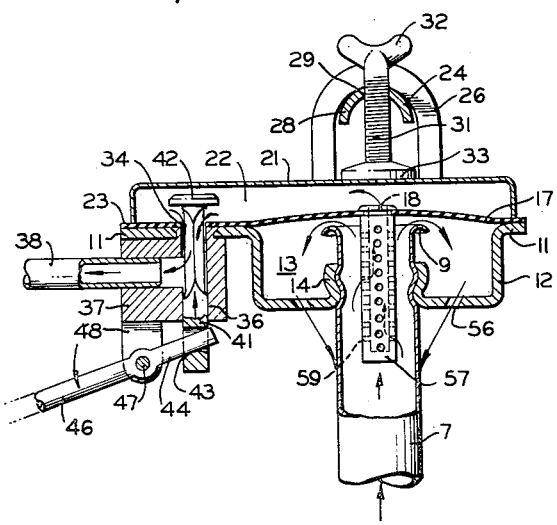
FIG_4
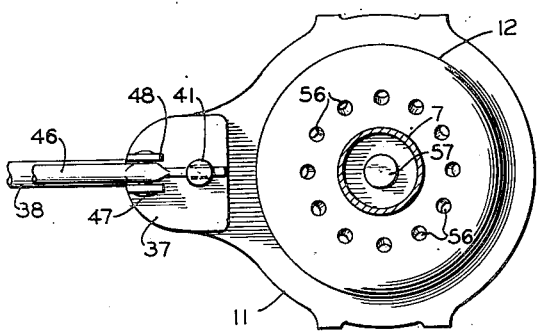
FIG_5
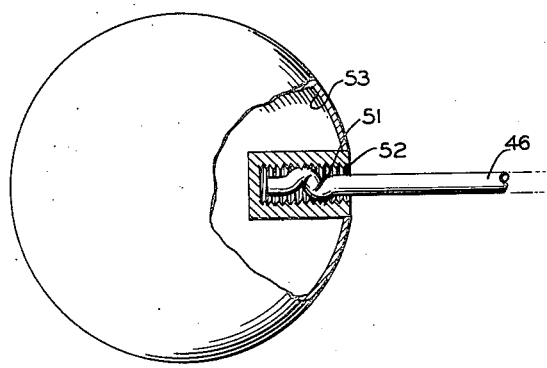
FIG_6
INVENTOR.
AVERY D. BUCHANAN
BY Lothrop & West
ATTORNEYS

2,811,169
LIQUID LEVEL CONTROL VALVE

Avery D. Buchanan, Sacramento, Calif.

Application April 19, 1956, Serial No. 579,211

7 Claims. (Cl. 137—414)

My invention relates to level responsive valves for controlling the flow of liquid, particularly of the sort used generally in closet tanks, and also of the sort shown in my co-pending application entitled, Liquid Level Control Valve, Serial No. 483,066, filed January 20, 1955, now Patent No. 2,761,466 dated Sept. 4, 1956 of which this application is a continuation in part.

It is an object of the invention to provide an improved liquid level control valve.

Another object of the invention is to provide a liquid level control valve which is relatively quiet and positive in operation.

A still further object of the invention is to provide a liquid level control valve which is reliable in operation over a protracted period despite the appearance of debris and particles in the actuating water.

A still further object of the invention is to provide a liquid level control valve which is readily manufactured, assembled and disassembled.

Further objects, together with the foregoing, are attained in the embodiment of the invention described in the accompanying description and illustrated in the accompanying drawings, in which Figure 1 is a cross section on a vertical plane through a water closet tank (portions being broken away) and showing the liquid level control valve of my invention installed therein.

Figure 2 is a plan of a portion of the liquid level control valve of my invention, a part being broken away to show the interior construction in cross section.

Figure 3 is a cross section on vertical medium plane through the liquid level control valve of my invention, the plane of section being indicated by the line 3—3 in Figure 2.

Figure 4 is a view similar to Figure 3, but showing the valve in open position.

Figure 5 is a bottom plan view of the liquid level control valve of the invention.

Figure 6 is a detail elevation of a float utilizing the connection with my liquid level control valve, a portion of the float being broken away to disclose in cross section the interior construction thereof, the plane of section being indicated by the line 7—7 in Figure 1.

In general, the present liquid level control valve is largely patterned on that shown in my co-pending application, but contains some of the features of improvement thereover to make the operation more nearly reliable under adverse circumstances, and to increase the quietness of operation.

While its use is not limited thereto, the liquid level control valve of the invention is conveniently and normally installed in the tank 6 of a water closet. This is normally provided with a water or fluid supply pipe 7 connected with the usual fittings 8 to extend generally vertically up into the tank where it terminates in a rounded lip portion 9. Substantially at the same level as the plane of the lip portion 9 is a marginal flange 11 outstanding from a valve body 12 conveniently fabricated of metal to provide a sump portion 13, and to have an internal flange 14, inter-engaging with a crimped portion of the water supply pipe 7, so that the supply pipe serves as a mounting standard for the body 12 in pressure type relationship therewith. If desired solder or welding can be utilized between the flange 14 and the pipe 7. Overlying the flange 11 and also the outturned portion 9 is a diaphragm 17 of rubber or comparable material. This diaphragm has an orifice 18 therein in approximate registry with the supply pipe 7. The diaphragm is positioned and held in place by a bonnet 21, contoured to provide an upper chamber 22, and having a margin 23 adapted to abut the diaphragm closely and hold it in fluid-tight relationship with the flange 11. This is accomplished by a fastening device 24, including a pair of studs 26 and 27 upstanding from the flange 11 at either side of the diaphragm 17, and which are spanned by a cross bar 28, having a threaded opening 29 therein to receive a threaded bolt 31. This has a winged end 32 at the upper portion and a washer 33 at the lower portion in contact with the diaphragm.

Also piercing the diaphragm is an opening 34 in registry with a passageway 36 extending through a valve housing or body 37, secured to the flange 11 and forming a continuation thereof. It can be considered that the passageway 36 also forms an opening in the flange 11. Intersecting the passageway 36 is a refill pipe 38, which extends through a drain tube 39, leading from the tank 6, the outer end of the refill tube 38 being bent downwardly and telescoping partly into the upper end of the drain tube 39.

Designed to operate within the passageway 36 is a valve stem 41 of a reduced non-circular cross section for a part of its length. The valve stem terminates in a valve head 42 designed to seat against the diaphragm 17 around the opening 34 and to block flow therethrough. The lower end of the valve stem 41 is provided with a cross slot 43 into which projects one end 44 of a float level rod 46. This rod is mounted by a pivot pin 47 in a pair of ears 48 depending from the valve body 37. The outer portion of the float level rod 46 is preferably given a helical twist 51, as especially shown in Figure 6, and is then threaded into an internally threaded socket 52, fastened to a float ball 53. The helical twist 51 serves equally well in a smooth walled socket, slight deformation of the helix as the twist is pushed into the socket serving frictionally to confine the helical twist.

The tank 6 is provided with the usual discharge valve 54, which also has a float function, and which is dislodged in the customary manner when the tank is to be emptied. The falling water level in the tank permits the float ball 53 to descend, and rocks the float level rod 46 about the pivot 47, to raise the valve stem 41. This lifts the valve head 42 from its sealing position over the opening 34, and permits the discharge of liquid from the chamber 22 through the passageway 36, and the refill pipe 38 to the drain tube 39. This discharge is augmented and assisted by the pressure on the underside of the diaphragm 17 from the supply pipe 7. There is a pressure drop from the supply pipe 7 to the refill pipe 38, inasmuch as the diameter of the orifice 18 is considerably less than the free passage area through the opening 34, and its adjuncts. The diaphragm 17 being flexible, lifts under such conditions away from the lip 9, so that water under pressure from the pipe 7 can flow over the lip 9 into the sump portion 13. This water then discharges from the sump portion through a plurality of apertures 56, which pass through the walls of the body 12 and are inclined inwardly and downwardly so that the water jets or streams passing through the openings 56, hit against or impinge upon the upstanding part of the water supply pipe 7, and are thus rendered relatively quiet in their impact. In this fashion water is admitted to the tank 6 without any substantial sound. The addition of water to the tank 6 when the valve 54 has closed, causes the tank to fill and the float ball 53 to rise, so that through the float level rod 46 the valve head 42 is again seated. The water under pressure then passes through the orifice 18 into the upper chamber 22, and eventually fills such chamber with liquid under pressure, which then forces the diaphragm 17 back into juxtaposition with the lip 9, and the parts are restored to their original condition, ready for a subsequent operation.

While the apertures 56 are relatively large and when the diaphragm 17 is away from the lip 9, there is a relatively large annular opening for waterflow, so that foreign particles and debris in the water are not particularly detrimental, the passages under the valve head 42 and alongside the stem 41 are relatively minute. For that reason I prefer to augment the orifice 18 through the diaphragm 17 with a strainer body 57. This is a member which has an outturned flange 58 at its upper end to mount it properly in the diaphragm and to suspend it therefrom within the water supply pipe 7. The body 57 is provided with a number of openings 59 therethrough, each of which is relatively minute. The body has not only the function of a strainer, but has a substantial mass that acts to urge the diaphragm 17 downwardly by gravity, in addition to any downward pressure, due to water that there may be thereon, and furthermore, has a substantial mass so as to damp out or preclude flutter of the diaphragm as it approaches its seating position on the lip 9. With the provision of the member 57 all of the liquid which enters the upper chamber 22 and is destined to be discharged under the valve 42 and along the stem 41, is necessarily cleaned of its foreign matter and debris by the small passages 59. Thus, while it is not necessary to strain or filter all of the incoming water, since that which passes through the apertures 56 cannot cause any substantial difficulty, still there is provided a means for straining that portion only of the water which might otherwise crowd the valve 42.

In accordance with the invention therefore, there has been provided a substantially improved liquid level control valve.

What is claimed is:

1. A liquid level control valve for use in a water closet comprising a valve body having a sump portion and a flange portion, a resilient diaphragm mounted on said body to overlie said flange portion and to cover said sump portion, a fluid supply pipe projecting upwardly through said sump portion and into contact with said diaphragm, the bottom of said sump portion having a plurality of ports inclined downwardly and inwardly toward said fluid supply pipe, a hollow multi-apertured stem depending from said diaphragm downwardly into said supply pipe and forming an orifice in said diaphragm, a housing mounted on the bottom side of said flange portion, a valve stem slidably disposed in a vertical passageway in said housing, said flange and said diaphragm, a valve seat mounted on the upper end of said stem, a refill pipe mounted on said housing and in horizontally intersecting relation with said passageway, a bonnet covering said diaphragm and forming a fluid chamber, means for clamping said bonnet to said valve body and against said diaphragm, and means for lifting said valve stem in dependence on the water level in the water closet.

2. A liquid level control valve comprising a valve body having a flange portion and a sump portion, a resilient diaphragm mounted on said valve body, a water supply pipe projecting upwardly through said sump portion into contact with said diaphragm in planar position thereof, the bottom of said sump portion having a plurality of ports inclined downwardly and inwardly toward said water supply pipe, means forming an orifice through said diaphragm in registry with said supply pipe, a housing mounted on the bottom side of said flange portion and having a passageway registering with an opening through said flange portion and said diaphragm, a valve movable in said passageway into and out of a position blocking said opening, a refill pipe normally intersecting said passageway below said opening, means on said housing for moving said valve, a bonnet overlying said diaphragm and said orifice and said opening therein, and means for securing said bonnet on said valve body.

3. A liquid level control valve comprising a vertically extending water supply pipe, a valve body secured to the upper end of said supply pipe and formed to define a sump portion and a surrounding flange substantially coplanar with the upper end of said supply pipe, there being a plurality of ports in the bottom of said sump portion each inwardly directed toward said supply pipe, a diaphragm overlying said flange and abutting the end of said supply pipe and there being an orifice in said diaphragm in registry with said supply pipe and there being an opening through said flange and said diaphragm, a bonnet overlying said diaphragm and abutting said flange, means for securing said bonnet on said body, a housing on said valve body and having a passageway therein registering with said opening, a refill pipe intersecting said passageway, a valve stem movable in said passageway and extending through said opening, a valve head on said valve stem in said bonnet, and means pivoted on said housing and engaging said valve stem for moving said valve head into and out of abutment with said diaphragm adjacent said opening.

4. In a liquid level control valve comprising a valve body having an apertured sump portion and a flange portion, a resilient diaphragm mounted on said body to overlie said flange portion and to cover said sump portion, a fluid supply pipe projecting upwardly through said sump portion and into contact with said diaphragm, a housing mounted on the bottom side of said flange portion, a valve stem slidably disposed in a vertical passageway in said housing, said flange and said diaphragm, said valve stem and said passageway defining an opening of predetermined cross-sectional area, a valve seat mounted on the upper end of said stem, a bonnet covering said diaphragm and forming a fluid chamber, means for clamping said bonnet to said valve body and against said diaphragm, and means for lifting said valve stem in dependence on the water level in a water closet, the combination of a hollow stem depending from said diaphragm downwardly into said supply pipe and forming an orifice in said diaphragm, the lower end of said hollow stem being closed, the walls of said hollow stem being pierced by a plurality of apertures smaller in cross-sectional area than said predetermined cross-sectional area of said valve stem opening, and a refill pipe mounted on said housing in intersecting relation with said valve stem opening.

5. The combination of claim 4 wherein said sump portion apertures are discrete, and wherein each of said sump portion apertures are directed downwardly and inwardly toward said fluid supply pipe.

6. The device of claim 4 wherein said refill pipe is disposed in a port in said housing in communication with said opening between said valve stem and the walls of said passageway, said port being inclined at an angle not above the horizontal.

7. The device of claim 4 in which said hollow stem depending from said diaphragm downwardly into said supply pipe is further characterized by extending downwardly into said supply pipe a distance such that said enclosed lower end of said hollow stem is at an elevation below the level of the bottom of said sump.

References Cited in the file of this patent

UNITED STATES PATENTS 2,371,830    Langdon    Mar. 20, 1945
2,761,466    Buchanan    Sept. 4, 1956